United States Patent [19]

Zichy

[11] 4,289,938
[45] Sep. 15, 1981

[54] VOICE AMPLIFICATION APPARATUS

[76] Inventor: Theodore B. R. Zichy, 8 Sandwich St., London, WC1H 9PL, England

[21] Appl. No.: 96,675

[22] Filed: Nov. 23, 1979

[51] Int. Cl.³ .............................................. H04M 1/05
[52] U.S. Cl. .................................................. 179/156 A
[58] Field of Search ............... 179/156 A, 157, 107 H; 181/128, 129

[56] References Cited

U.S. PATENT DOCUMENTS

| | | | |
|---|---|---|---|
| 3,280,273 | 10/1966 | Flygstad et al. | 179/156 A |
| 3,513,269 | 5/1970 | Wilson | 179/107 E |
| 3,548,118 | 12/1970 | Hutchings | 179/156 A |
| 4,118,606 | 10/1978 | Larkin | 179/156 A |

FOREIGN PATENT DOCUMENTS 1377237 12/1974 United Kingdom ........... 179/156 A

Primary Examiner—George G. Stellar
Attorney, Agent, or Firm—Jenkins, Coffey, Hyland, Badger & Conard

[57] ABSTRACT

Voice amplification apparatus for use by persons whose normal speech processes have been damaged or impaired.

The apparatus includes a microphone unit which is electrically connectable to an amplifier unit and means for enabling the unit to be supported solely from the ear of the user and includes a self-supporting sound energy tube connected at one end to the microphone unit and which is so shaped as to present, when in use, a sound energy input end adjacent to the user's mouth.

3 Claims, 1 Drawing Figure

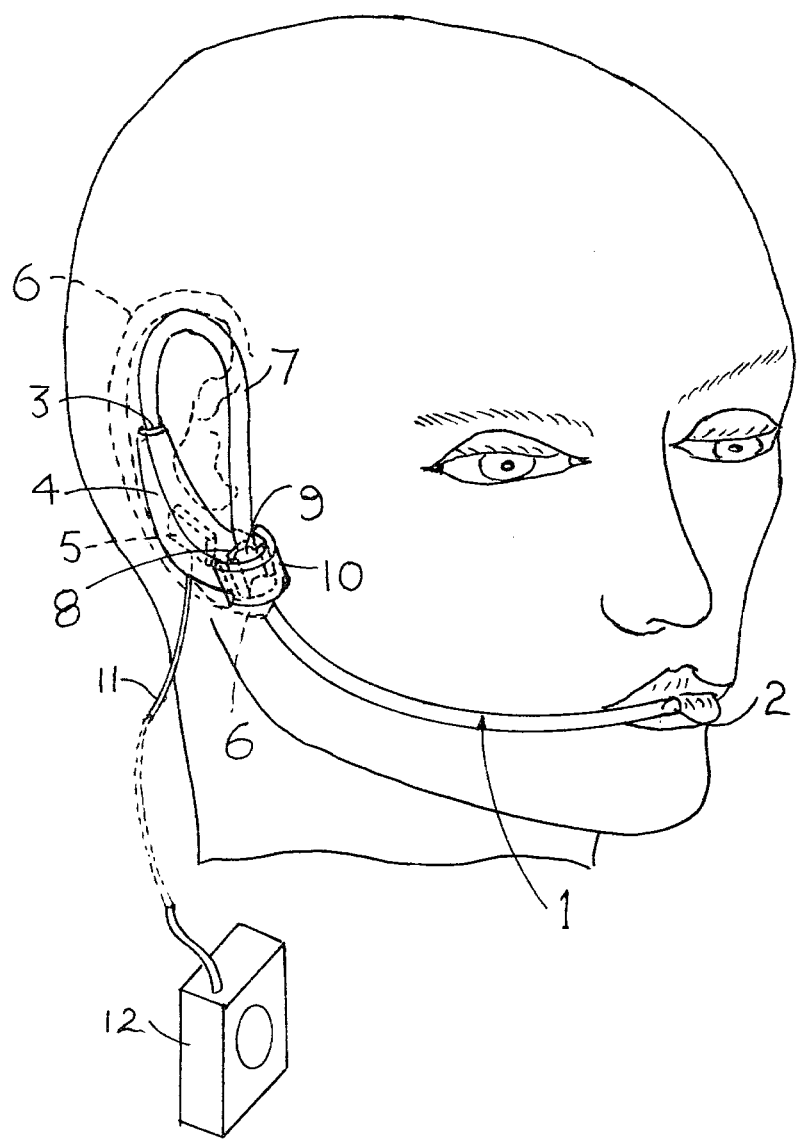

VOICE AMPLIFICATION APPARATUS

This invention relates to voice amplification apparatus and is more particularly concerned with apparatus for assisting persons whose speech processes have been impaired.

With the advance of medical techniques certain medical conditions can be relieved by surgery. However, it is sometimes an unfortunate consequence of such medical treatment that the patient's normal spoken voice is damaged, for example, by reason of loss of voice or a substantial reduction in the volume of the voice.

Such speech impairment can arise in connection with patients suffering from Parkinson's decease, Laryngectomes and the like.

It is known to provide such patients with hand held microphones which are connected electrically with portable battery driven amplifier units.

Even though with the rapid advance of electronic technology the physical size of such microphones is decreasing the need for a patient to have to hand hold continuously a microphone is not only a matter of physical inconvenience and bother but also an impairment of the freedom of the user or patient in his everyday activities. Furthermore it will be apparent that the necessity to hold a microphone can be of a particular inconvenience to those people whose speech impediment is accompanied by other physical disabilities involving loss of use of a limb.

A further important factor in connection with impairment of speech is that it is usually essential to position the microphone as closely as possible to the mouth so that the continous presence of a conventional microphone can be irritating to the listener with whom the user of the microphone is having a conversation.

It is an object of the present invention to provide a microphone support arrangement which eliminates the need to hand hold the microphone.

SUMMARIES OF THE INVENTION

According to the present invention there is provided voice amplification apparatus including a microphone unit electrically connectable to an amplifier unit, and adapted for mounting adjacent to and from an ear of the user, and including an elongate self supporting sound energy guide tube attached at one end to the microphone unit and being so shaped as to be able to present, when in use, a sound energy input end adjacent to the user's mouth.

Preferably, the means provided for mounting the microphone unit are such that the microphone unit is at least partially obscured by the user's ear.

Conveniently, the guide tube forms at least a part of the means whereby the microphone unit can be supported from the ear.

BRIEF DESCRIPTION OF THE DRAWINGS

For a better understanding of the invention and to show how to carry the same into effect reference will now be made to the accompanying drawing in which an embodiment of the apparatus of the invention is shown in its operational position upon a very schematically represented head, in which the formation of an ear is shown in dashed lines.

DESCRIPTION OF THE PREFERRED EMBODIMENTS

The apparatus includes a relatively small diameter 3/16 inches (4.9 mm) tube of transparent plastics material which is of such physical characteristics that the tube is self supporting. The tube 1 has an open end 2 which serves as an inlet for the sound energy of the user's voice. The other end 3 of the tube 1 connects with a generally crescent shaped hollow housing 4 which contains a microphone unit 5. The shaping of the housing is such that the housing is able to lie snugly against the side of the user's head effectively behind the user's ear 6. In practice, the shape would be such as to be as unobtrusive as possible compatible with the functions of the apparatus.

The tube 1 is shaped to define a loop 7 which in use passes over the ear so as to be substantially out of sight behind the upper parts of the ear.

The housing 4 has a region 8 which is shaped to locate and receive a region 9 of the tube 1. The region 9 of the tube is held in place against the housing region 8 by a retaining clip 10 which is so dimensioned that the tube region 9 is a smooth push fit in the nip defined between the region 8 and the clip. This enables the user to selectively adjust the size of the loop by a simple sliding movement i.e., push-pull, to increase or decrease the size of the loop 7. This facility enables the user to adjust the loop size so that the apparatus can be readily fitted to the ear as is shown in the drawing and then adjust the loop size so that the loop is tight enough to hold the apparatus in place without unnecessary discomfort to the user. It will thus be seen that the apparatus is held in place solely by its engagement with the ear.

In other words the mounting arrangements for the voice amplification apparatus completely avoids the need for retaining straps or the like passing over the user's head or the need to wear a special headpiece carrying the speaking tube.

In addition, it will be noted that even though the ear is utilised for the mounting of the apparatus the user's hearing processes are not impeded. Also it will be apparent that the use of the apparatus does not interfere with the use of hearing aids or the like.

Furthermore, the tube 1 is so shaped that when the apparatus is supported from the ear the tube follows the general line of the jaw structure in that it curves generally along the side of the downwardly directed portion of the user's jaw with the end region of the tube turning around the jaw to position the tube end 2 immediately in front of the mouth.

In practice, the precise length of the tube 1 and the open end 2 can be set so as to lie at the most convenient position for the user.

In use, when the user speaks and sound energy is produced at least a part of the energy is intercepted by the open end of the tube so that a proportion of the sound waves in the immediate vicinity of the user's mouth are transmitted along the tube 1 into the housing 4 thereby to activate the microphone 5. The latter will be provided with a suitable electrical connection 11 amplifier unit 12, the latter being only schematically indicated since such amplifiers are well known in the art.

I claim:

1. Voice amplification apparatus including a microphone unit; a housing for the microphone unit which is shaped so as to be able to lie behind or substantially behind the ear of the user; an elongate self supporting sound energy guide tube attachable at one end to the housing, the sound energy guide tube being shaped to provide a loop which engages over the user's ear to provide suspension means for supporting the housing adjacent the user's ear, and which loop is adjustable for the purposes of obtaining a desired degree of fit of the loop to the user's ear, the shaping of the sound energy guide tube also being such that when the housing is supported adjacent the user's ear a sound energy input end is presented adjacent to the user's mouth.

2. Voice amplification apparatus as claimed in claim 1, in which said loop is formed by lengthwise slidably connecting the loop to the housing of the microphone unit at a location spaced from the position at which the tube end connects with the housing, said slidable connection being arranged to provide said loop size adjustability.

3. Voice amplification apparatus as claimed in claim 2, in which the portion of the sound energy guide tube between the slidable connection and the end of the tube providing the sound energy inlet conforms to the general shape of the user's cheek.

* * * * *